G. W. GOODRIDGE.
SPLICING TOOL.
APPLICATION FILED APR. 12, 1919.
1,382,500.
Patented June 21, 1921.
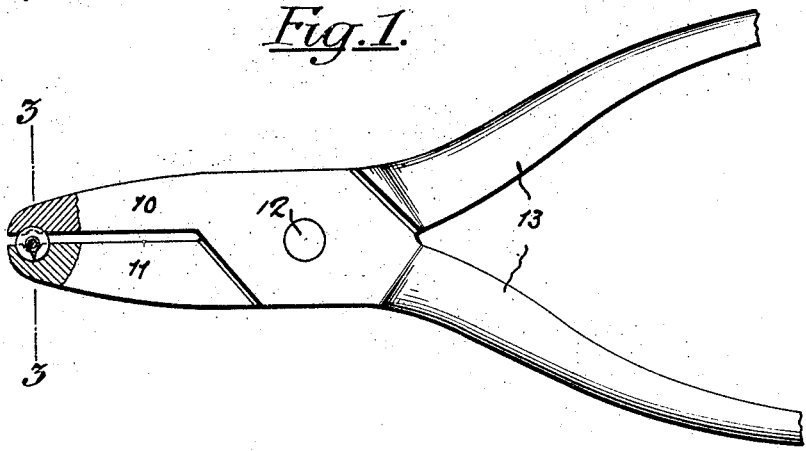
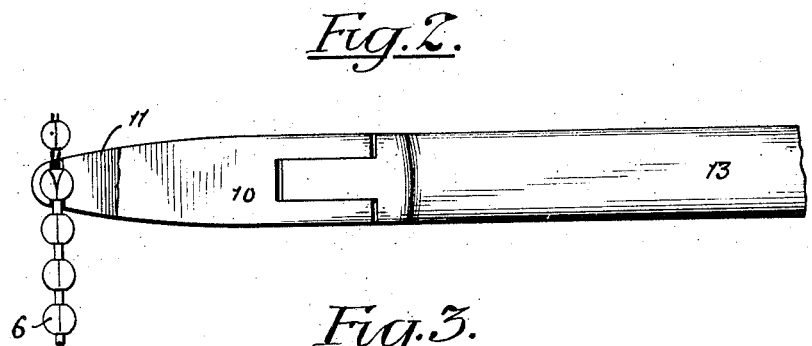
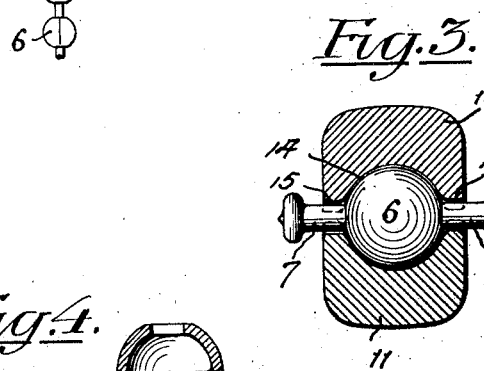
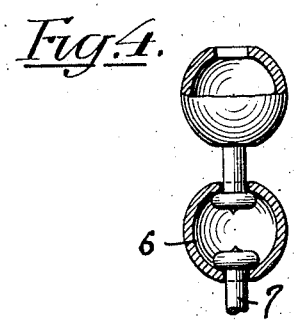
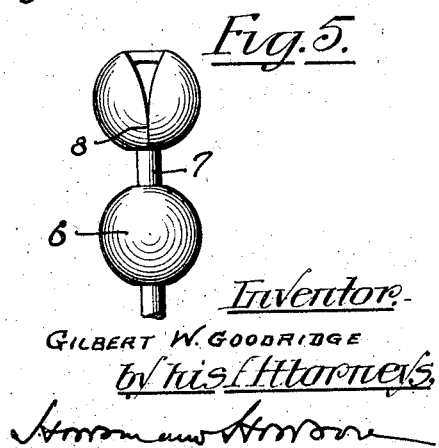
Inventor-
GILBERT W. GOODRIDGE
by his Attorneys

UNITED STATES PATENT OFFICE.

GILBERT W. GOODRIDGE, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

SPLICING-TOOL.

1,382,500.

Specification of Letters Patent. Patented June 21, 1921.

Application filed April 12, 1919. Serial No. 289,666.

*To all whom it may concern:*

Be it known that I, GILBERT W. GOODRIDGE, a citizen of the United States of America, residing at Bridgeport, in the county of Fairfield and State of Connecticut, have invented certain new and useful Improvements in Splicing-Tools, of which the following is a specification.

My invention relates to splicing tools, and particularly to a tool for splicing chains, the object of my invention being to provide a suitable appliance for pinching the ball element of a chain upon the head of an associated dumb-bell link in coupling adjacent chain ends together.

In the accompanying drawings—

Figure 1 is a broken side elevation of a tool in which my invention is embodied in one form;

Fig. 2 is a broken plan thereof;

Fig. 3 is a vertical section on the line 3—3 of Fig. 1, but showing the jaws closed;

Fig. 4 is a longitudinal section partially in elevation through a bead chain of the type upon which the present tool is designed to operate; and Fig. 5 is a side elevation of the chain showing one ball element spread in readiness for splicing.

In my co-pending application, filed herewith, I have described a tool for spreading the ball of a chain of the type upon which the present tool is adapted to operate. After the ball has been spread and the end of the dumb-bell link inserted, the ball must be closed again in order to retain the head of the link, and the present invention relates to a pinching tool adapted to effect the closure of the spread ball upon the link, thus to complete the splicing operation.

A chain of the type mentioned comprises alternate balls 6 and interconnecting dumb-bell links 7, the shanks of which pass through end apertures in the balls, and the heads of which are engaged within the balls as indicated. Each ball comprises a seam 8 extending from one aperture to the other in the ball and affording a joint which may be readily opened by means of the spreader described in my co-pending application above referred to. A ball thus opened by the spreader is shown in Fig. 5 drawn to an enlarged scale. In order to close the ball after the insertion of the head of the splicing link 9, a tool such as shown in Figs. 1 to 3 may be utilized.

As here indicated the tool comprises a pincers having jaws 10 and 11 pivoted at 12 and operated by the usual hand extensions 13. Each jaw is centrally recessed in register adjacent its free end to form a cup 14, the cups coöperating to afford a recess in which the ball 6 may be accommodated. Extending transversely of each jaw and opening centrally to each recess 14 is a shallow groove 15, the grooves in the respective jaws lying in register and extending on opposite sides of the recess 15 to form passages which accommodate the shanks of the links 7 and 9 on opposite sides of the ball 6. The jaws 10 and 11 are tapered as indicated so that ample clearance is afforded for the balls 6 adjacent the spread ball engaged by the jaws.

It is obvious that upon pressing the jaws 10 and 11 together the spread end of the ball 6 is closed, and the head of the splicing link 9 engaged within the ball in precisely the same manner as the ordinary joint between the balls and links of the chain, thus completing the splicing operation. The channels 15 accommodate the shanks of the links 7 and 9 as the jaws 10 and 11 close, and not only prevent injury thereto but permit the full closure of the jaws to complete the pinching operation upon the spread ball.

While I have shown the ball 6 as spherical, it is to be understood that the tool may be adapted to operate upon balls of any appropriate shape, such for instance as tubular, angular, diamond shaped, etc., it being necessary only to vary the shape of the recess as required to accommodate balls of this type. The word "ball" is used in the following claims in a sense broad enough to include such variant shapes.

Modifications in detail of construction of the tool will readily occur to those skilled in the art which do not depart from what I claim as my invention.

I claim—

1. A splicing tool comprising a pair of jaws cupped in register on their meeting faces to form a recess, said recess extending to points adjacent the opposite edges of the jaws, in combination with shallow channels of like width opening from said cups to form passage ways to accommodate the shanks of dumb-bell links engaged by and extending in opposite directions from the sides of a chain ball seated in said recess.

2. In a splicing tool, a pair of jaws tapering in width and cupped on their meeting faces to form a recess, and channels extending transversely of the jaws and coöperating to form passage ways for links engaging the ball seated in said recess, said cupped recesses and channels being formed in the tapered end of the jaw at a point at which the width of the jaw is less than the space between the balls lying on each side of the ball engaged in the recess.

In testimony whereof I have signed my name to this specification.

GILBERT W. GOODRIDGE.